(12) United States Patent
Sanberg et al.

(10) Patent No.: US 12,504,511 B2
(45) Date of Patent: Dec. 23, 2025

(54) V2X FOR SENSOR CROSS CHECKS AND DIAGNOSIS

(71) Applicant: NXP B.V., Eindhoven (NL)

(72) Inventors: Willem Pieter Sanberg, Einhoven (NL); Nicolas Harmen Lehment, Munich (DE); Vincent Pierre Martinez, Venerque (FR)

(73) Assignee: NXP B.V., Eindhoven (NL)

( * ) Notice: Subject to any disclaimer, the term of this patent is extended or adjusted under 35 U.S.C. 154(b) by 279 days.

(21) Appl. No.: 18/060,849

(22) Filed: Dec. 1, 2022

(65) Prior Publication Data

US 2023/0176183 A1 Jun. 8, 2023

(30) Foreign Application Priority Data

Dec. 3, 2021 (EP) ..................... 21306706

(51) Int. Cl.
*G01S 7/40* (2006.01)
*B60W 50/02* (2012.01)
(Continued)

(52) U.S. Cl.
CPC ........... *G01S 7/40* (2013.01); *B60W 50/0205* (2013.01); *G01S 13/89* (2013.01); *G01S 13/931* (2013.01);
(Continued)

(58) Field of Classification Search
CPC . G01S 7/003; G01S 7/021; G01S 7/40; G01S 7/4004; G01S 7/4039; G01S 7/411; G01S 7/412; G01S 7/415; G01S 7/4804; G01S 2007/4975; G01S 13/89; G01S 13/93; G01S 13/931; G01S 2013/9316; G01S 2013/93271; G01S 15/89; G01S 15/931; G01S 17/89; G01S 17/93; G01S 17/931;
(Continued)

(56) References Cited

U.S. PATENT DOCUMENTS 10,094,906 B2  10/2018 Vijaya Kumar et al.
10,486,485 B1 * 11/2019 Levinson ........... B60G 17/0162
(Continued)

FOREIGN PATENT DOCUMENTS

DE   102012024456 A1   1/2014
DE   102014003937 A1   9/2015
(Continued)

*Primary Examiner* — Brandon Z Willis

(57) ABSTRACT

A method, system, apparatus, and architecture are provided for validating one or more sensors by collecting and processing sensor data signals from on-board vehicle sensors to generate a local environmental map identifying one or more first traffic features located in an exterior environment of the vehicle, by collecting and processing sensor data signals from a remote traffic participant to generate an external environmental map identifying one or more second traffic features located in an exterior environment of the remote traffic participant, and by performing a diagnostic sensor cross check on on-board sensors by comparing the local environmental map with at least the external environmental map to detect any discrepancy between the one or more first traffic features and the one or more second traffic features which indicates that one or more of the on-board sensors is defective.

19 Claims, 6 Drawing Sheets

(51) Int. Cl.
*G01S 13/89* (2006.01)
*G01S 13/931* (2020.01)

(52) U.S. Cl.
CPC . *B60W 2050/0215* (2013.01); *B60W 2556/45* (2020.02); *G01S 2013/93271* (2020.01)

(58) Field of Classification Search
CPC ..... B60W 50/0205; B60W 2050/0215; B60W 2420/40; B60W 2420/403; B60W 2420/408; B60W 2420/54; B60W 2556/45; B60W 2556/65
See application file for complete search history.

(56) References Cited

U.S. PATENT DOCUMENTS

| | | | |
|---|---|---|---|
| 10,503,170 B2* | 12/2019 | Du | G01S 7/40 |
| 10,796,501 B2 | 10/2020 | Cheng et al. | |
| 11,884,299 B2* | 1/2024 | Hosoi | B60W 60/0016 |
| 2018/0052222 A1 | 2/2018 | Zeisler | |
| 2018/0211520 A1 | 7/2018 | Offenhaeuser et al. | |
| 2020/0209848 A1* | 7/2020 | Mercep | G05D 1/0088 |
| 2020/0209852 A1* | 7/2020 | Soryal | H04W 4/024 |
| 2020/0385008 A1 | 12/2020 | Terechko et al. | |
| 2022/0155081 A1* | 5/2022 | Ahn | B60W 60/0011 |
| 2022/0177005 A1* | 6/2022 | Gottbehut | G01S 7/412 |

FOREIGN PATENT DOCUMENTS

| | | |
|---|---|---|
| DE | 102014226020 A1 | 6/2016 |
| DE | 102016007014 A1 | 12/2017 |
| DE | 102019002487 A1 | 10/2020 |

\* cited by examiner

V2X FOR SENSOR CROSS CHECKS AND DIAGNOSIS

BACKGROUND OF THE INVENTION

Cross-Reference to Related Applications

This application claims the priority under 35 U.S.C. § 119 of European patent application no. 21306706.9, filed Dec. 3, 2021, the contents of which are incorporated by reference herein.

FIELD OF THE INVENTION

The present invention is directed in general to automotive safety systems. In one aspect, the present invention relates to advanced driver-assistance systems (ADAS) and methods of operating same to assist with vehicle operation.

BACKGROUND

One of the fastest growing segments in the automotive electronics industry is in the area of Advanced Driver Assistance Systems (ADAS) technologies which reflect a rising interest in road and traffic safety, both at the level of the government and the individual. In operation, vehicles with ADAS systems can detect and classify objects, alert the driver of hazardous road conditions and/or control the vehicle (e.g., automatically decelerate or stop the vehicle) based on the sensed vehicle situation. Existing driving automation systems rely on a variety of sensors, such as short and long range radars, cameras and lidars, to model and respond to the driving environment, primarily relying on a mix of camera, radar, ultrasonic, and lidar sensor technologies which are combined with a sensor fusion approach to arrive at situational awareness and/or driving conditions. This reliance on sensor data will only increase with fully automated ADAS vehicles where multiple orthogonal and complementary sensors are used together to provide information and redundancy to enhance safety and improve the driver's performance. However, existing vehicle sensor systems use only onboard sensors to test and diagnose their performance and operational status, typically by analyzing the level of hardware functioning, such as by monitoring power consumption and performing internal status checks. Although these onboard checks have value, they cannot always detect other sensor performance errors, such as faults arising from sensor degradation due to dirt, age, electromagnetic interference or faulty software updates. As seen from the foregoing, the existing sensor-based vehicle driving systems have limited sensor diagnosis and testing capabilities which constrain the ability of such sensor-based vehicle driving systems to meet the applicable safety performance requirements by conforming with design, complexity and cost constraints.

BRIEF DESCRIPTION OF THE DRAWINGS

The present invention may be understood, and its numerous objects, features and advantages obtained, when the following detailed description of a preferred embodiment is considered in conjunction with the following drawings.

Figure 1:
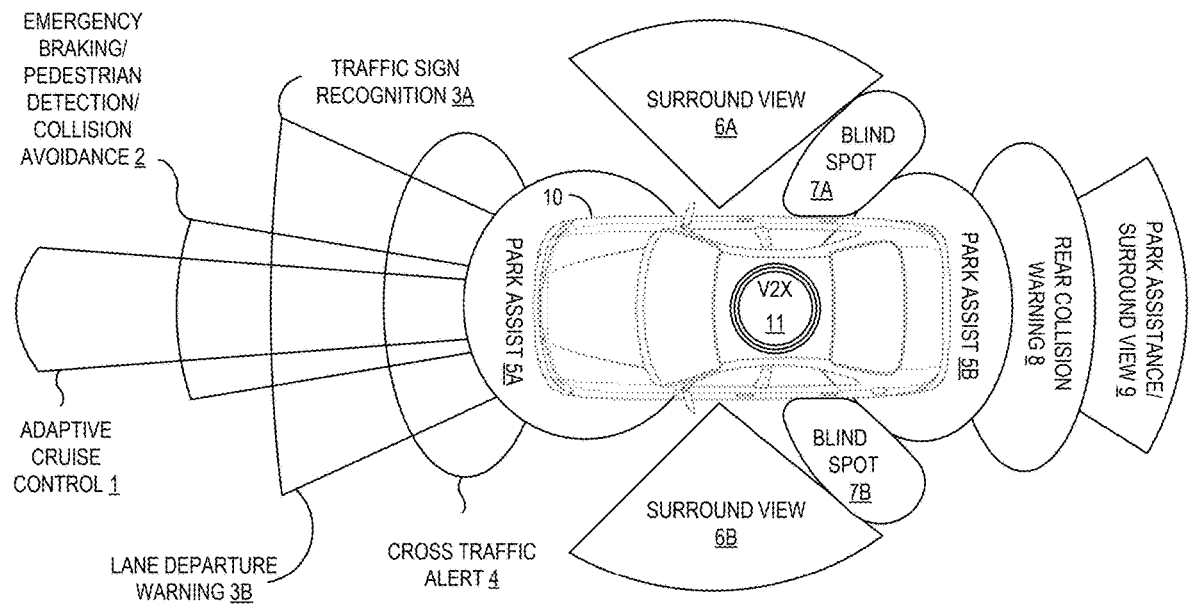
FIG. 1 depicts a simplified plan view of a vehicle which includes various sensors, vision systems, controllers, and communications systems in accordance with selected embodiments of the present disclosure.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A vehicle driving apparatus, system, method, and program code are described for performing on-board sensor cross check and diagnosis, testing and analysis by using V2X (Vehicle-to-everything) network message information collected from external V2X sources (e.g., other vehicles and/or network infrastructures) to test and diagnose the performance and operational status of one or more on-board sensors. In selected embodiments, a vehicle driving system uses on-board sensors to create a sensing map around the vehicle, and also collects one or more additional sensing maps and/or external sensor information from external V2X sources, where each of the sensing maps may include one or more different layers of information. By detecting features in a shared mapping space from the on-board and external sensing maps, a comparison of the detected feature(s) from the on-board sensing map with the detected feature(s) from the external sensing map(s) can be used to identify a potential on-board sensor error if there are features detected by an external V2X source that are not detected by the vehicle. By comparing the on-board sensing map (which provides the vehicle's own perception of the surrounding environment) with one or more external sensing maps (which provide the perception(s) of other traffic participants) the vehicle driving system can diagnose and validate the operation of the on-board sensors system and/or detect discrepancies and abnormal behavior with the on-board sensors. Processed in real time with inexpensive processing techniques, the collection and comparative feature analysis from on-board and external sensing maps can be used to detect sensor faults (e.g., sensor degradation due to dirt, age, electromagnetic interference, faulty updates, or other factors which might otherwise be hard to detect) and to increase vehicle safety by facilitating detailed and structured evaluation of sensor performance. As a supplementary layer of safety to existing sensor systems which evaluate only the level of hardware functioning, the use of external V2X sensing maps disclosed herein enables the performance of sensor diagnosis at a task-level to determine if the vehicle's on-board sensors correctly perceive the environment.

To provide additional details for an improved contextual understanding of selected embodiments of the present disclosure, reference is now made to FIG. 1 which depicts a simplified plan view 100 of a vehicle 10 including various sensors, vision systems, controllers, and communications systems, including a V2X communication system 11, which may be used with a vehicle control system. For example, the vehicle 10 may include long-range sensors (e.g., long-range radar) at the front of the vehicle 10 typically for use with adaptive cruise control applications 1. The vehicle 10 may also include lidar sensors at the front of the vehicle typically for use with emergency braking, pedestrian detection, and/or collision avoidance applications 2. In addition, a front vision system, such as a camera, provides images towards the front of the vehicle 10 typically for use with traffic sign recognition applications 3A and/or lane departure warning applications 3B. On the sides of the vehicle 10, a side view system, such as a camera, provides surround views 6A, 6B for at least part of the side views. Similarly, a rear vision system, such as a camera, provides images towards the rear of the vehicle 10 typically for use with park assistance and/or surround view applications 9. For closer monitoring, the vehicle 10 may include short or medium-range sensors (e.g., radar) at the front for use with cross traffic alert applications 4 and at the rear for use with rear collision warning applications 8. In addition, the vehicle may include short or medium-range sensors on the sides for blind spot applications 7A, 7B. Finally, the vehicle may include short-range sensors, such as ultrasound sensors, at the front and back of the vehicle for use with park assist control 5A, 5B. Though not explicitly shown, it will be appreciated that any suitable type and connection of sensors can be used and connected with a GPS system and vehicle-to-infrastructure (V2X) communications system 11 to provide communications between the vehicle 10 and other structures, such as other vehicles, road-side systems.

As used herein, the V2X communications system 11 provides a communication interface for connecting the vehicle 10 into a network with any other entity (e.g., other vehicles on the road, supporting road infrastructure, etc.) that may affect, or may be affected, by the vehicle 10. As will be appreciated, a V2X communication system may incorporate other, more specific types of communications, including but not limited to V2I (vehicle-to-infrastructure), V2N (vehicle-to-network), V2V (vehicle-to-vehicle) or V2P (vehicle-to-pedestrian). Serving as the access layer for Intelligent Transport Systems (ITS), the V2X network can be realized with different communication technologies, such as the 4G/5G cellular, 4G/5G sidelink V2X or IEEE802.11p (as for DSRC or ITS-G5) V2X as an ad hoc network in the 5.9 GHZ band. In selected embodiments, the V2X communications system 11 enables the vehicle 10 to communicate with other road entities using standardized messages that contains useful information for ITS applications. For example, ETSI ITS-G5 in Europe defines Cooperative Awareness Messages (CAM) to exchange basic safety type of data between the different V2X entities. Having standardized format and emission rules, the CAM messages are generated with specified message fields (e.g., ITS PDU header, Basic Container, High Frequency Container, Low Frequency Container, Special Vehicle Container, Additional Custom Container) using specified triggering mechanisms which consider the dynamics of the vehicle such as speed, change in direction (heading), and change in speed. Each of these parameters can cause the generation of a CAM if they reach a certain defined threshold.

Figure 2:
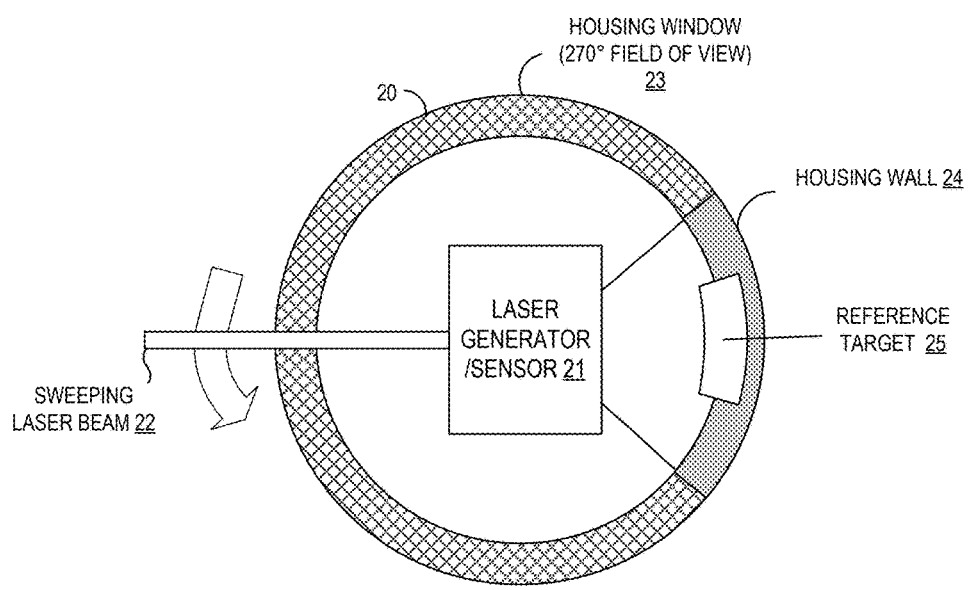
FIG. 2 depicts a simplified top view of a safety laser line scanner with a single reference target used for sensor diagnostics.

As will be appreciated, one or more of the vehicle sensors (e.g., cameras or vision sensors) may be continuously or periodically monitored for proper operational functioning using diagnostic testing. To provide additional details for an improved understanding of selected embodiments of the present disclosure, reference is now made to FIG. 2 which depicts a simplified top view 200 of a laser-based LIDAR scanner sensor 20 which may be used in industrial and/or automotive applications to detect and range objects. In operation, the scanner 20 includes a laser generator/sensor 21 to generate a sweeping laser beam 22. For example, the laser generator/sensor 21 may include one or more laser sources and microelectromechanical mirrors connected to generate pulses or beams of radiation into the surrounding spherical space. When the generated laser beam is rotated and transmitted through the transparent external housing window 23, any laser beam reflections provide 270° view of the surrounding area. For example, laser pulses from the sweeping laser beam 22 may reflect back from surrounding objects and return to the scanner 20 where sensors and/or photodetectors at the laser generator/sensor 21 process the reflected laser pulses with receiver electronics to calculate the distance traveled. To periodically test for proper operation, the LIDAR scanner sensor 20 may perform on-board testing to diagnose the sensor performance and operational status of the sensor hardware functioning. For example, by including a reference target 25 that is located inside an opaque housing wall 24, the sweeping laser beam 22 generated by the sensor 20 will detect the reference target 25 inside the scanner housing wall 24. As the sweeping laser beam 22 passes over the reference target 25 on each sweep, the laser generator/sensor 21 compares the reading of the reference target 25 to preset values to detect any divergent readings. In this way, critical failures, like a stuck mirror, degradation of the laser source or degradation of the receiving sensor, can be tested. Similar self-contained diagnostic mechanisms exist for other sensors to perform internal status checks, such as monitoring power consumption or the like, but such diagnostic tests cannot always detect performance errors or faults arising from sensor degradation due to dirt, age, electromagnetic interference or faulty software updates.

Figure 3:
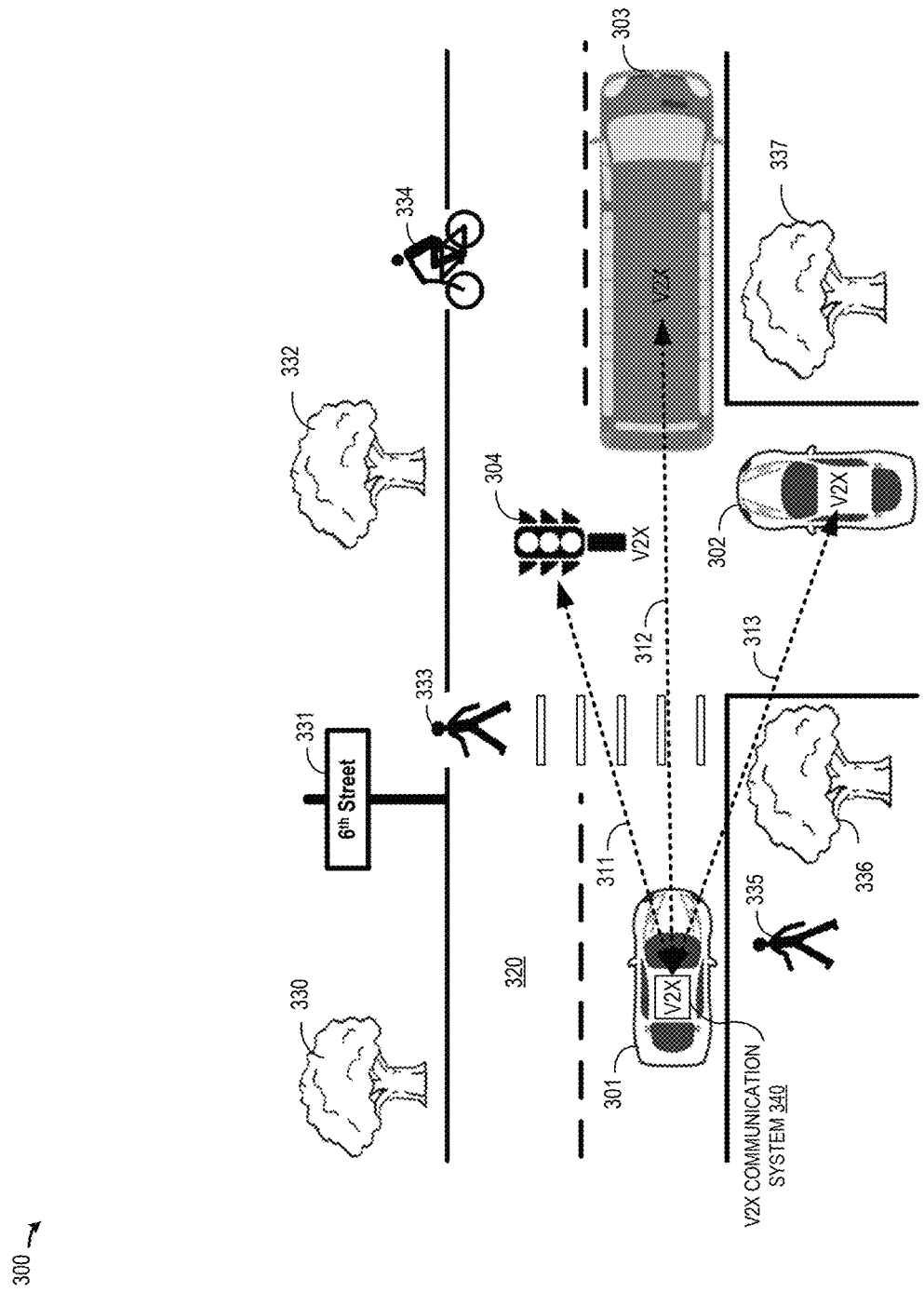
FIG. 3 depicts an example scenario to illustrate a first vehicle communicating in a network of V2X vehicles or devices to obtain information on the vehicle's surrounding environment in accordance with selected embodiments of the present disclosure.

To address these limitations from conventional solutions and others known to those skilled in the art, reference is now made to FIG. 3 which depicts an example scenario for a real-world environment 300 in which a first vehicle 301 communicates in a network of V2X vehicles 302-303 and/or device(s) 304 to obtain information on the vehicle's surrounding environment 330-337 in accordance with selected embodiments of the present disclosure. For example, the real-world environment 300 depicts a self-driving, autonomous driving, or Highly Automated Driving (HAD) vehicle 301 which may include a safety-aware configuration of sensors and systems/subsystems that detect safety conflicts as the first vehicle 301 travels along a travel path along a drivable space or road 320. Using at least the configuration of sensors and systems/subsystems, the first vehicle 301 is made aware of various objects, traffic control input, roads, etc. 302-304, 330-337 that are present in the world environment 300. Awareness of such objects, traffic control input, roads, etc. allows the first vehicle 301 to continue along the travel path 320 without safety conflicts, such as a collision with the pedestrian 333.

Objects in world environment 300 can be stationary, moving, or stationary one moment and moving a moment later. Examples of stationary objects can include trees 330, 332, 336, 337. Moving objects can include other vehicles 302, 303, and cyclists 334. Examples of stationary objects that can becoming moving objects can include pedestrians 333, 335. In addition, traffic control lights 304 and signs 331 can also be considered as stationary objects. Furthermore, the drivable space or a road 320 is a stationary part of world environment 300. Because the location of the first vehicle 301 and other objects in the world environment 300 can change or move over time, potential safety conflicts or safety threats are constantly changing. Therefore, the safety conflicts for a given travel path 320 are predicted at the first vehicle 301 based on a snapshot of the stationary and/or moving objects 302-304, 330-337 at a moment in time during various projected times in the future.

To obtain this snapshot information, the first vehicle 301 can include a plurality of different sensors and inputs, such as optical, camera, radar, lidar, sonar, global navigation satellite system (GNSS), inertia, velocity, cellular telephone, dedicated short range communication (DSRC), etc. Such sensors can detect the objects 302-304, 330-337 in world environment 300 as three-dimensional geometric objects having associated spatial dimensions. In selected embodiments, the configuration of sensors and systems/subsystems on the first vehicle 301 may assemble, for each detected object 302-304, 330-337, a three-dimensional box and/or or other data structure having an associated position, orientation, direction and speed. For example, the first vehicle 301 may detect and assemble a first data structure including the position, orientation, direction and speed of the vehicle 301, and may also assemble additional data structures with the position, orientation, direction, and speed for the other vehicles 302, 303. In addition, the first vehicle 301 may detect and assemble data structures with the position, orientation, direction and speed for the pedestrians 333, 335 and other road users (e.g., bicyclist 334). The first vehicle 301 may also detect and assemble data structures for stationary objects, such as the road curvature, width, and lane geometries of the drivable space or a road 320; the position and shape of the trees 330, 332, 336, 337, traffic signs 304, 331, road markings, houses, etc. Furthermore, all the data structures may include a list of their anticipated values for the projected future time moments.

In addition to environmental position/speed sensors and inputs, the first vehicle 301 includes a V2X communication system 340 which is configured to communicate with one or more external V2X sources (e.g., vehicle 302, bus 303, traffic signal 304) using any suitable V2X communication channel(s) 311-313, such as a 5.9 GHZ ITS band or V2X based on 4G and 5G NR cellular networks. In accordance with the present disclosure, the V2X communication system 340 uses the communication channel(s) 311-313 to obtain full or partial environment maps from each V2X source which identify the environmental features (e.g., cars, stationary infrastructure, pedestrians . . . ) in the surrounding real world environment 300 with the goal of validating sensor readings and interpretation at the first vehicle 301 using on-board diagnosis and crosschecking of the sensors outputs against the externally generated environment maps. In the case there is a detected discrepancy between a locally generated environment map (generated by sensors at the first vehicle 301) and any environment maps received from external V2X sources (e.g., vehicle 302, bus 303, traffic signal 304), diagnostic testing at the first vehicle 301 can determine there may be a potential sensor error and/or collision event at the first vehicle 301. For example, if the V2X communication system 340 at the first vehicle 301 receives environment maps 311-313 from one or more external V2X sources 302-304 which detect or identify an environmental feature (e.g., a pedestrian 333) that was not detected by a front-radar sensor at the first vehicle 301, the diagnostic testing results would indicate that the front-radar sensor may be defective and may require additional corrective processing. On the other hand, if the V2X communication system 340 receives environment maps 311-313 which identify the same environmental features as are identified in an environment map that is locally generated by sensors at the first vehicle 301, the diagnostic testing results would validate the proper operation and functioning of the sensors at the first vehicle 301.

In the depicted example, the first vehicle 301 may be configured to run self-tests of its sensor suite on a fixed schedule, on certain triggering events or when prompted by its driver to verify proper operation of it is on-board sensors by comparison to external sources of information provided by any device or vehicle capable of V2X communication and environment sensing, such as another vehicle 302 equipped with a full package of sensors, a nearby bus 303 with at least a rear view camera, or a smart traffic light 304 with cameras or other sensors. In the case where the first vehicle 301 is driving toward an intersection of the road 320 which has a V2X traffic light 304 and one or more V2X vehicles 302, 303, the V2X communication system 340 at the first vehicle 301 obtains information on its surroundings via inputs from one or multiple of its sensors. This locally generated information from the sensors of the first vehicle 301 may be generated as a first sensor map $M_{V1}$ of the local environment, where $M_{V1}$ can consist of a single measurement of an obstacle, an advanced local dynamic map created from multiple sensors' inputs, or anything in between. In addition, the first vehicle 301 may poll the nearby V2X devices 302-304 for their view or perception of the surrounding environment. The externally generated from the external V2X devices 302-304 may be generated as one or more external sensor maps $M_E$ which describe their respective perceptions of the surrounding environment, with the same possible variance in detail or completeness described above. The external sensor maps $M_E$ may be denoted as maps $M_1 \ldots M_N$ for easier generalization.

By comparing the vehicle's own view of environmental features (identified in a locally generated environment map $M_{V1}$) with the perception of other traffic participants (identified in externally generated environment maps $M_E$), the first vehicle 301 can validate the operation of the onboard sensors system, and potentially detect discrepancies and abnormal behavior. This diagnostic technique may be especially useful to catch faults arising from sensor degradation due to dirt, age, electromagnetic interference, faulty software updates, or other factors which might otherwise be difficult to detect. More specifically, the disclosed diagnostic technique offers increased safety by using environment maps received from external V2X sources to facilitate detailed and structured evaluation of sensor performance at a task-level to determine if the configuration of sensors and systems/subsystems at the first vehicle 301 correctly perceives the environment. As such, the disclosed diagnostic technique provides a complementary layer of safety protection which adds to existing diagnostic analysis of the hardware functioning, power consumption etc.

Figure 4:
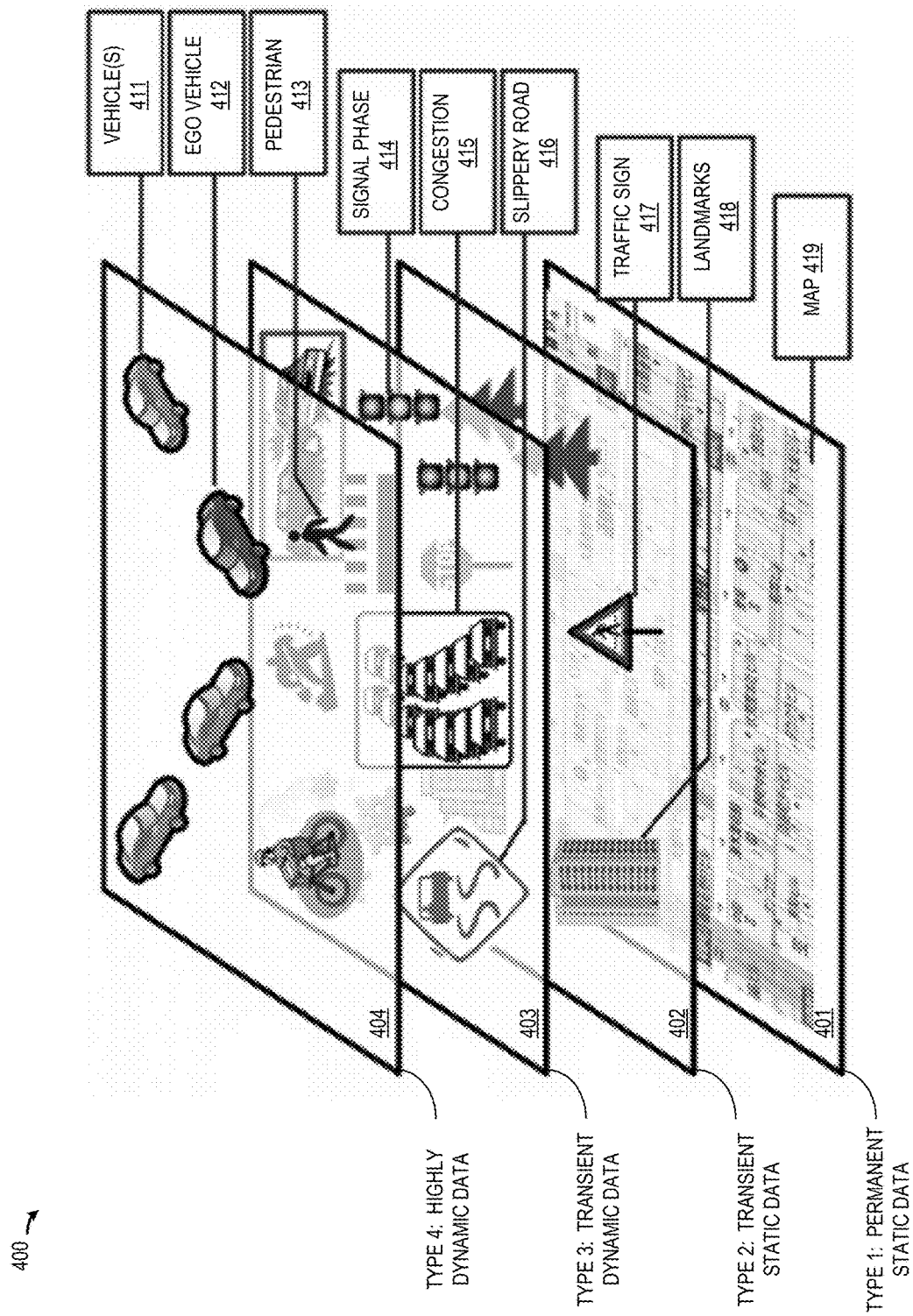
FIG. 4 provides an example depiction of a plurality of different layers of an environment map in accordance with selected embodiments of the present disclosure.

To provide additional details for an improved understanding of selected embodiments of the present disclosure, reference is now made to FIG. 4 which provides an example depiction of a plurality of different layers 401-404 of an environment map 400 which provides a dynamic and real-time view of traffic and other features in the local environment. In selected embodiments, the environmental map 400 may be implemented as multi-level map which is structured to convey all traffic-related information which could be collected with different frequency intervals from multiple sensor sources on a vehicle. Each layer or level of the map 400 specifies information gathering and data processing about the surrounding environment. For example, a first or bottom layer 401 (Type 1) includes permanent static data which describes immovable feature(s), such as road map data 419 describing the local roadway environment. In addition, a second layer 402 (Type 2) includes transient static data which identifies relatively static features, such as landmark 418 or traffic signs 417 that are not included in Type 1 map data. The third layer 403 (Type 3) includes transient dynamic data which identifies relatively dynamic traffic features, such as slippery roads 416, congestion 415, signal phase information 414, and other traffic conditions. Finally, the fourth or top layer 404 (Type 4) includes highly dynamic data which identifies automotive sensor information identifying the location, velocity or direction of pedestrians 413, Ego vehicle 412, or other vehicle(s) 411.

As disclosed herein, each V2X device 301-304 may generate its own sensor map 400 which identifies the respective perception of features in the surrounding environment, and the generated maps are then communicated over the V2X communication channel(s) 311-313 to the first vehicle 301 for use in diagnostic cross-checking and evaluation of the sensors at the first vehicle 301. As will be appreciated, each map 400 may include any number of measurements of objects in all levels 401-404 of the map 400, without loss of generalizability of the proposed concept. More specifically, it is not required to have a new standardized world model representation. The current V2X protocols are a sufficient source of information that can be exploited by the proposed V2X-based on-board sensor validation system.

Once received at the first vehicle 301, sensor diagnostic testing is performed on each map to identify the relative positioning between respective points of observation. In this way, the spatial overlap is determined between the first vehicle's sensor map $M_{V1}$ and each of the external sensor maps $M_E=M_1 \ldots M_N M_n$. If the space observed by each map is larger than a predefined area (e.g., greater than 3 m$^2$), then a shared subspace $M_{V1}^S$ and $M_E^S$ may be extracted from each map for further cross validation. The sensor diagnostic testing process then identifies or extracts notable features $F_{V1}^S$ and $F_E^S$ from each subspace map. Preferably, each extracted feature should be easily distinguishable from both vantage points. Depending on the sensing capabilities of the respective mapping sources, the extracted features may be a relatively high or coarse level (e.g., "there is a car here") or may be a relatively detailed or fine level (e.g., "there is a 5 cm notch in the curb"). Typically, the minimum resolution setting for extracted features should be set by the sensing capabilities of the first vehicle 301 where the sensor diagnostic testing is performed. In addition, each of the V2X sources may qualify their observations with a confidence score to indicate its own perception performance.

At the first vehicle 301, the sensor diagnostic testing process compares the extracted features $F_{V1}^S$ and $F_E^S$ to determine whether there are features $F_E^S$ visible to an external V2X source (e.g., 302-304) that are not in the features $F_{V1}^S$ detected by the first vehicle 301. In addition, the sensor diagnostic testing process may assign a severity score to features seen by an external V2X source (e.g., 302-304) that are not detected by the first vehicle 301, where each severity score is determined by the anticipated sensor visibility of the missed features. For example, a low severity score may be assigned to a patch of leaves on the ground missed by the first vehicle 301 (as these are easily missed), but a high severity score may be assigned to a missing vehicle that is supposed to be within the perception field of the first vehicle 301. This severity score can be further specified as depending on relative distance, relative speed and sensor confidence scores, if available.

As disclosed herein, the sensor diagnostic testing process performed at the first vehicle 301 may compare the features $F_{V1}^S$ detected by the first vehicle 301 against features $F_E^S$ from each available source of observation to create a sum of missed feature instances that are weighted by their severity score. If the weighted sum of the missing feature(s) is larger than a minimum threshold, the integrity of the sensing capabilities of the first vehicle 301 should be flagged or identified as degraded so that subsequent actions can be performed, such as inspection, disabling automation features, etc.

Figure 5:
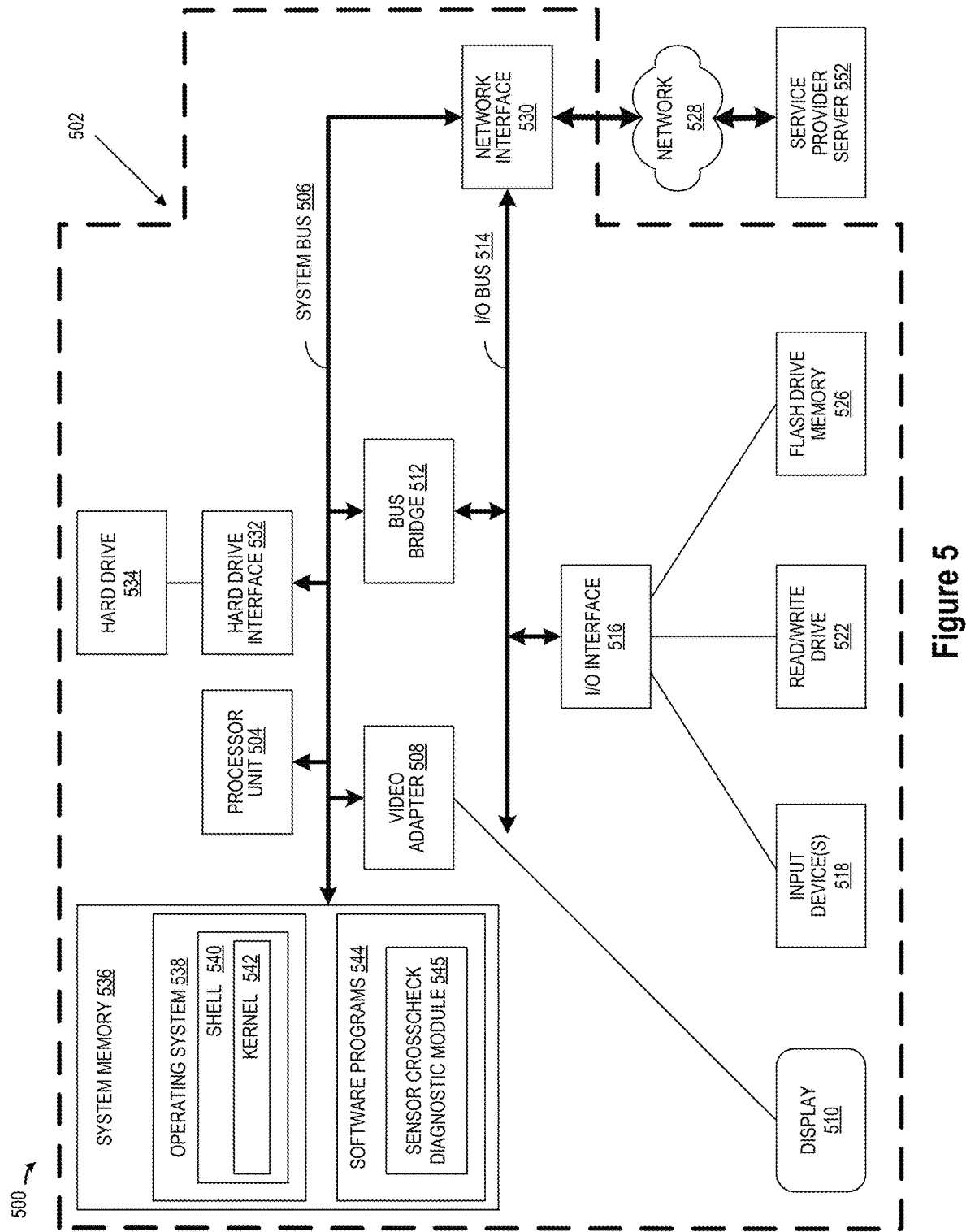
FIG. 5 depicts a block diagram of an information processing system capable of performing computing operations which use external sensor information to perform cross checks and diagnosis of on-board sensors in accordance with present disclosure.

To provide additional details for an improved understanding of selected embodiments of the present disclosure, reference is now made to FIG. 5 which depicts a block diagram 500 of an information processing system 502 capable of performing computing operations which use external sensor information to perform cross checks and diagnosis of on-board sensors. As disclosed herein, the sensor cross check and diagnosis functionality may be implemented entirely in selected hardware, entirely in software (including firmware, resident software, micro-code, etc.) or in embodiments combining software and hardware aspects that may all generally be referred to herein as a "circuit," "module" or "system." Certain implementations may incorporate all, fewer, or greater than the components described herein.

The depicted information processing system 502 includes a processor unit 504 that is coupled to a system bus 506. Processor unit 504 can have various architectures, such as a system on a chip (SOC), electronic control unit (ECU), general-purpose processor, multiprocessor, custom compute accelerator, FPGA, hard-wired ASIC, etc. A video adapter 508, which controls a display 510, is also coupled to system bus 506. System bus 506 is coupled via a bus bridge 512 to an Input/Output (I/O) bus 514. An I/O interface 516 is coupled to the I/O bus 514 to provide communication with various I/O devices, including one or more input devices 518, a read/write drive 522, and a flash drive memory 526. In accordance with the present disclosure, the input devices 518 may include one or more short and long range radar, camera and/or lidar sensors. The format of the ports connected to I/O interface 516 may be any known to those skilled in the art of computer architecture, including but not limited to Universal Serial Bus (USB) ports. The information processing system 502 is able to communicate with a service provider server 552 via network 528 using a network interface 530, which is coupled to system bus 506.

A hard drive interface 532 is also coupled as an interface between the hard drive 534 and system bus 506 to populate a system memory 536, which is also coupled to system bus 506. Data that populates system memory 536 includes the operating system (OS) 538 and software programs 544 for the information handling system 502.

The OS 538 includes a shell 540 for providing transparent user access to resources such as software programs 544. Generally, shell 540 is a program that provides an interpreter and an interface between the user and the operating system. More specifically, shell 540 executes commands that are entered into a command line user interface or from a file. Thus, shell 540 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 542) for processing. While shell 540 generally is a text-based, line-oriented user interface, the information handling system 502 can also support other user interface modes, such as graphical, voice, gestural, etc. As depicted, OS 538 also includes kernel 542 in which lower levels of functionality for OS 540 are implemented, including essential services required by other parts of OS 538 and software programs 544, including memory management, process and task management, disk management, and mouse and keyboard management.

The software programs 544 may include any number of applications executed by the information handling system 502. In accordance with selected embodiments of the present disclosure, one of the software programs 545 is a sensor crosscheck diagnostic module 545 which is configured to with program code to perform on-board sensor cross check and diagnosis by using environmental sensor data collected from external sources (e.g., externa V2X vehicles and/or network infrastructures) to test and diagnose the performance and operational status of one or more on-board sensors 518 at the information handling system 502.

The hardware elements depicted in the information processing system 502 are not intended to be exhaustive, but rather are representative to highlight components that can be implemented by the present disclosure. For instance, the information processing system 502 may include alternate memory storage devices. These and other variations are intended to be within the spirit, scope and intent of the present disclosure.

Figure 6:
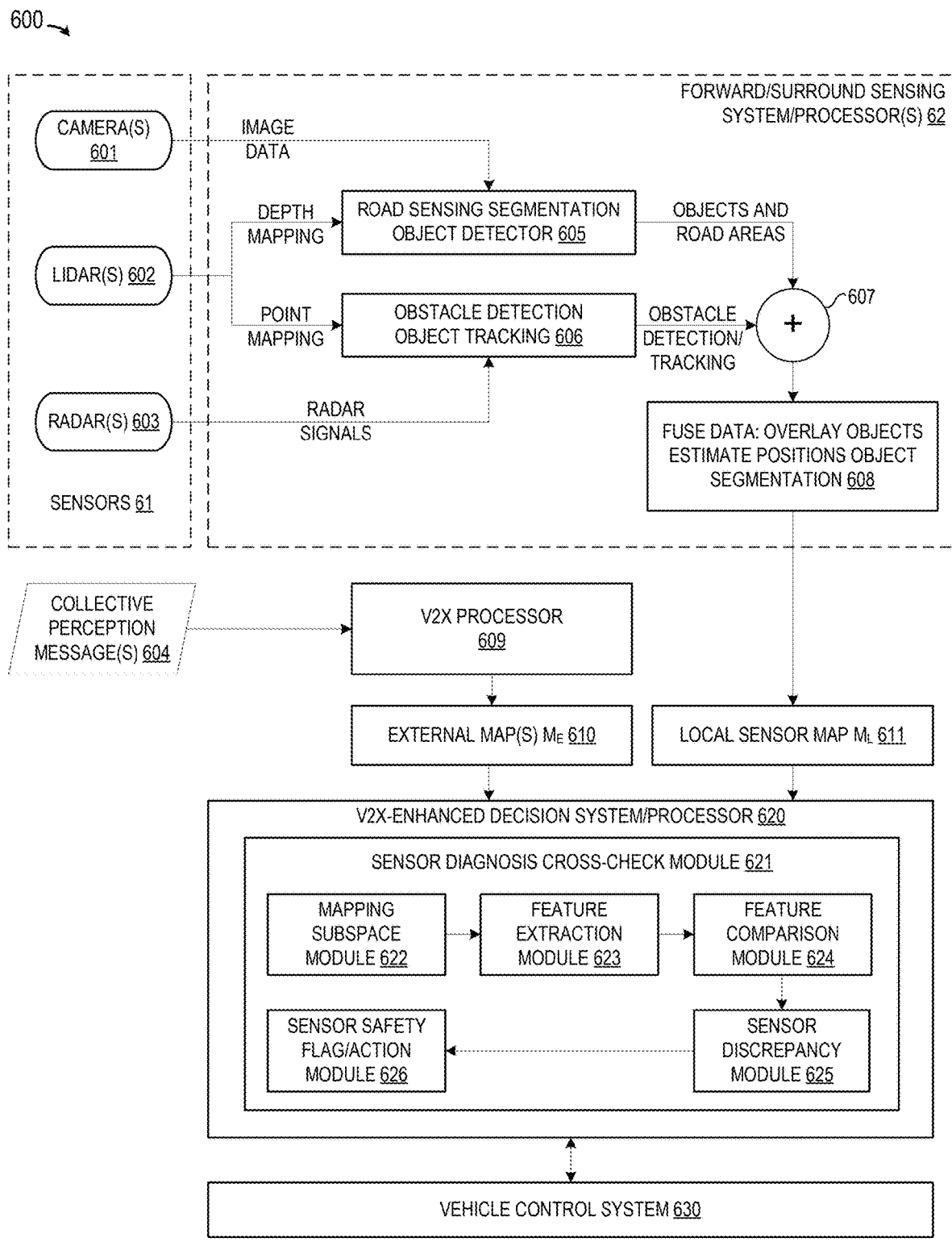
FIG. 6 depicts a simplified block diagram depiction of a digital processing system for diagnosing and validating one or more local sensors by comparing a local sensor map with one or more external sensor maps in accordance with selected embodiments of the present disclosure.

To provide additional details for an improved understanding of selected embodiments of the present disclosure, reference is now made to FIG. 6 which depicts a simplified block diagram of a digital processing system 600 for diagnosing and validating one or more local sensors by comparing a local sensor map with one or more external sensor maps. In operation, the system 600 includes a plurality of on-board sensors 61, such as one or more camera sensors 601, lidar sensors 602, and/or radar sensors 603, to generate a local sensor map $M_L$. 611 around an automotive vehicle. For example, the sensors 61 may include one or more camera sensors 601 positioned around a vehicle. As will be appreciated, camera sensors can actually "see" the surrounding environment, and may be used to detect and classify objects, recognize texture, detect traffic signs, and the like. Using the camera sensor(s) 301, a 3D map of the area surrounding the vehicle can be constructed. The sensors 61 may also include one more active sensors, such as lidar sensors 602 or radar sensors 603, positioned around the vehicle. Each radar sensor 603 may be part of a detection system that uses radio waves to determine the range, angle, or velocity of objects in the vicinity of the vehicle. In similar fashion, the lidar sensor(s) 602 may be included as part of a detection system that measures distance to a target by illuminating the target with pulsed laser light and measuring the reflected pulses with the lidar sensor. Other types of active sensors can be included, such as an ultrasound sensor or other sound-based sensors (not shown) that measure the distance to nearby objects by sending out a sound pulse with high frequency then pick up the reflected waves. Of course, any suitable sensor can be included in the plurality of sensors 61, such as an image sensor, infrared sensor, or the like.

As illustrated, the sensors 61 are connected to provide input data to the forward/surround sensing system 62 which may be embodied as one or more processors. For example, with automotive applications providing advanced driver-assistance system (ADAS) capabilities that are compliant with specified Automotive Safety Integrity Level (ASIL) risk classification schemes (e.g., ASIL levels A-D, where A is the lowest safety requirement and D is the highest safety requirement), the forward/surround sensing system 62 may be implemented to perform risk analysis for complex scenarios (e.g., automated driving, driver assistance, pedestrian avoidance, etc.) with a first forward sensing processor (for implementing a drive processing channel or path) and a second surround sensing processor (for implementing a safety processing channel or path). In this arrangement, the first forward sensing processor may perform drive channel/path processing of intensive and complex computations based on input data from the camera(s) 601, lidar(s) 602, and radar(s) 603 using very complex algorithms, high data bandwidth, and significant computational resources. In addition, a second V2X-enhanced decision processor 620 may perform sensor diagnostic analysis of the sensors 61 by comparing a local sensor map 611 with one or more external sensor maps 610 to check if the on-board sensors 61 are operationally functional. In selected embodiments, the sensor diagnostic analysis may be computed in a system that is completely separate from the main decision factor, such as by using a "low cost" partner processor 620. However, it will be appreciated that the forward/surround sensing system 62 may be implemented with a single processor, alone or in combination with additional processing hardware to perform sensor diagnostic analysis based on sensor diagnosis cross-checking against external sensor maps.

At a general level, the sensors 61 are connected to a forward or surround sensing system or processor(s) 62 to generate sight sensing data from the ADAS sensors 601-603, including image data from the camera(s) 601, depth and point mapping data from the lidar sensor(s) 602, and radar signals from the radar(s) 603. In particular, each camera sensor 601 may be connected to provide image data to a road sensing segmentation and object detector module 605 which is also connected to receive depth mapping data from one or more lidar sensors 602. Using any suitable image processing techniques, the road sensing segmentation and object detector module 605 is configured to generate output data which identifies objects and road areas from the input depth mapping and image data. In addition, each radar sensor 603 may be connected to provide radar signal data to an obstacle detection and object tracking module 606 which is also connected to receive point mapping data from one or more lidar sensors 602. Using any suitable signal processing techniques, the obstacle detection and object tracking module 606 is configured to generate output data which identifies and tracks detected obstacles from the input point mapping and radar signals. At the fusion module 607, the outputs from the road sensing segmentation and object detector module 605 and the obstacle detection and object tracking module 606 are combined using any suitable signal combination techniques. The resulting fused data 608 that is output from the fusion module 607 includes overlay objects along with estimated positions and object segmentation data, thereby providing a local sensor map ML. 611 that is computed from the on-board sensors 61, such as the camera(s) 601, lidar(s) 602, and radar(s) 603. As disclosed herein, updated iterations of the local sensor map $M_L$. 611 may be periodically generated, such as when a vehicle runs self-tests of its sensor suite 61 on a fixed schedule or on certain triggering events or when prompted by its driver.

On such self-test events, the system 600 may also include a V2X processor 609 which is connected and configured to generate one or more external sensor maps $M_E$ 610. For example, the V2X processor 609 may be configured to communicate with one or more external V2X sources using any suitable V2X communication channel(s) to obtain collective perception messages 604 which identify the environmental features (e.g., cars, stationary infrastructure, pedestrians, etc.) in the area surrounding each external V2X source, and to then generate the corresponding external sensor maps 610. Alternatively, the V2X processor 609 may be configured to obtain or retrieve full or partial external sensor maps 610 which identify the environmental features in the area surrounding each external V2X source.

At the V2X-enhanced decision system or processor(s) 620, the external sensor map(s) $M_E$ 610 and local sensor maps $M_L$. 611 are processed with a sensor diagnosis cross-check module 621 to validate the readings from the sensors 61 using on-board diagnosis and crosschecking of the sensors outputs against the externally sensor map(s) $M_E$ 610. To this end, the sensor diagnosis cross-check module 621 includes a mapping subspace module 622 which is configured to identify an overlap area between the one or more external maps $M_E$ 610 and the local sensor map $M_L$ 611, and if necessary, to identify an extracted shared sub-space from the maps 610, 611 when the overlap area is too large.

The sensor diagnosis cross-check module 621 also includes a feature extraction module 623 which is configured to extract notable local features $F_L^S$ and external features $F_E^S$ from the shared subspace maps 610, 611. The feature extraction module 623 preferably identifies features that are easily distinguishable from all vantage points of the external V2X sources using a minimum resolution that is set by the sensing capabilities of the digital processing system 600. In selected embodiments, the feature extraction module 623 may use information provided by the external V2X sources to assign a confidence score to each extracted feature which indicates perception performance.

The sensor diagnosis cross-check module 621 also includes a feature comparison module 624 which is configured to compare the local and external features sets $F_L^S$, $F_E^S$ to identify any "missing" features from the external features $F_E^S$ that are not included in the local feature set FE. In selected embodiments, the feature comparison module 624 assigns a severity score to each "missing" feature based on the relative visibility or importance of the missed feature. The severity score assigned by the feature comparison module 624 can be further specified as depending on relative distance, relative speed and sensor confidence scores, if available.

The sensor diagnosis cross-check module 621 also includes a sensor discrepancy module 625 which is configured to evaluate the "missing" features and any associated scores to determine if there are any sensor discrepancy readings from the on-board sensors 61. In selected embodiments, the sensor discrepancy module 625 is configured to compare features extracted from each available source of observation and create a sum of missed feature instances, weighted by their severity score. If the weighted sum is larger than a threshold, the sensor discrepancy module 625 identifies which of the one or more of the sensors 601-603 has degraded integrity or capability.

The sensor diagnosis cross-check module 621 also includes a sensor safety flag or action module 626 which is configured to identify any required corrective actions for the identified sensor(s) 601-603 which failed to detect a "missing" feature that was identified by the external V2X sources. For example, the corrective action may include flagging a sensor for inspection, disabling one or more automation features associated with a flagged sensor, etc. Alternatively, if the sensor discrepancy module 625 determines that there are no "missing" features, then the sensor safety flag or action module 626 may validate the operation of all on-board sensors 61. Based on the evaluation results by the sensor safety flag or action module 626, the V2X-enhanced decision system/processor 620 issues commands or instructions to the vehicle control system 630 which may be implemented with one or more electronic control units (ECUs), such as a gateway ECU, automatic braking system ECU, electronic power steering ECU, engine EC U, instrumentation ECU, or the like.

To provide an example of such a use-case failure, the collective perception messages 604 collected from one or more external V2X sources may convey or generate an external map 610 which includes a traffic feature (e.g., an oncoming car) that is not included in the local sensor map 611 generated from the on-board sensors 601. Upon comparison of the external and local sensor maps 610, 611, the sensor diagnosis cross-checking module 621 may indicate that an undetected "threat" is present in the external sensor map(s) 610. In response, the V2X-enhanced decision system/processor 620 can set a command safety flag which conveys a "warning" message to prevent a collision, detect a moving object, or otherwise improve the operational safety of the vehicle. In addition or in the alternative, the V2X-enhanced decision system/processor 620 can notify the forward/surround sensing system 62 that one of the sensors 61 is operationally defective and requires corrective action.

To implement the depicted functionality for diagnosing and validating on-board local sensors 61 by comparing a local sensor map 611 with one or more external sensor maps 610, the forward/surround sensing system 62 and/or V2X-enhanced decision system 620 may include any suitable processing device, such as a processor, CPU, microprocessor, a microcontroller, or the like, that may be programmed with software instructions and/or programming code. In addition, the processing device(s) may be embodied with one or more processors, each having one or more processor cores included therein. In addition, the processing device(s) may be a complex instruction set computing (CISC) microprocessor, reduced instruction set computing (RISC) microprocessor, very long instruction word (VLIW) microprocessor, or processor implementing other instruction sets, or processors implementing a combination of instruction sets. In addition or in the alternative, the processing device(s) may be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

A memory connected to the processing device(s) over a memory bus may store programming code and/or software instructions for execution by the processing device to perform sensor cross check and diagnosis, testing and analysis by using V2X (Vehicle-to-everything) network message information collected from external V2X sources. The memory may include one or more volatile storage (or memory) devices such as random access memory (RAM), dynamic RAM (DRAM), synchronous DRAM (SDRAM), static RAM (SRAM), or other types of storage devices. In addition or in the alternative, the memory may include non-volatile memory, such as read only memory (ROM), electrically erasable programmable ROM, flash memory, or the like. In whatever form, the memory may store information including sequences of instructions that are executed by the processing device or any other device. For example, executable code and/or data, in including but not limited to an operating system, device drivers, firmware (e.g., input output basic system or BIOS), and/or applications can be loaded in the memory and executed by the processing device.

Figure 7:
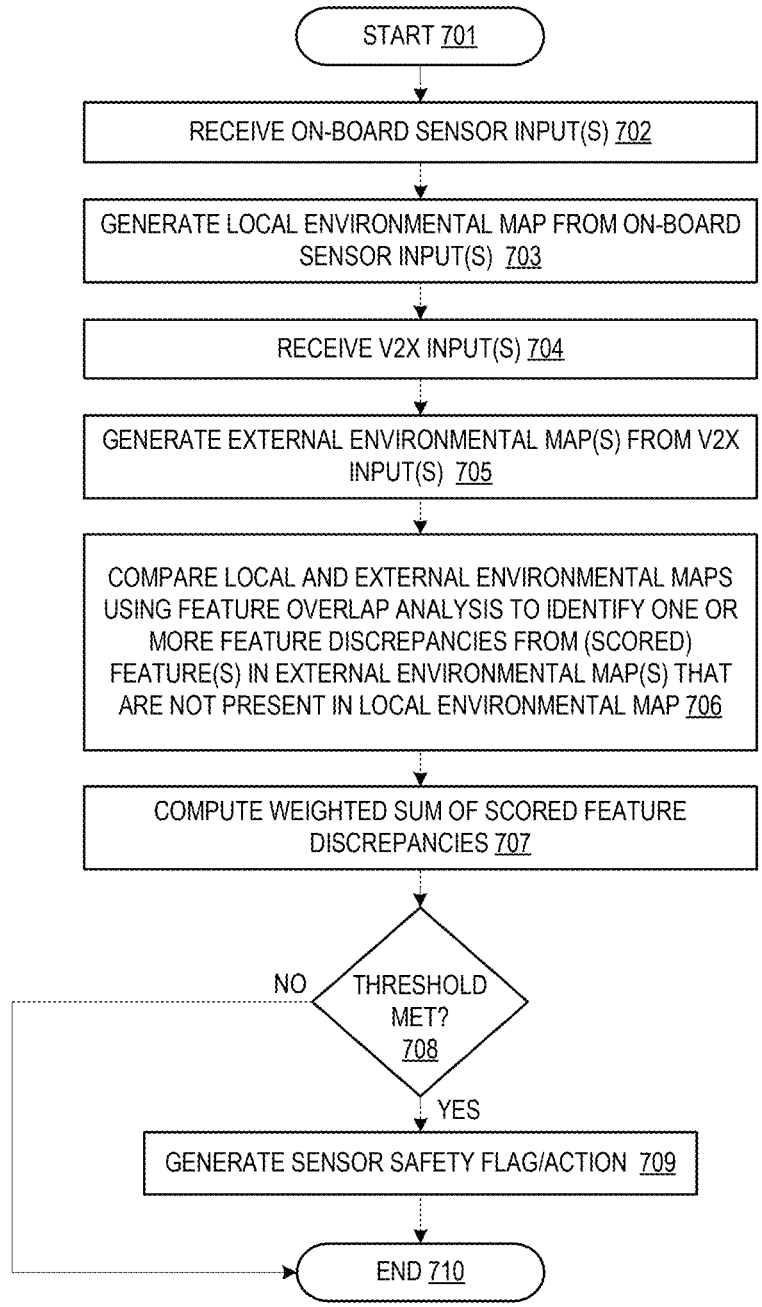
FIG. 7 illustrates a simplified flow chart showing the logic for performing sensor cross check and diagnosis in a V2X communication network in accordance with selected embodiments of the present disclosure.

To provide additional details for an improved understanding of selected embodiments of the present disclosure, reference is now made to FIG. 7 which depicts a simplified flow chart 700 showing the logic for performing sensor cross check and diagnosis based on external sensor signal received from a V2X communication network. In an example embodiment, the control logic and methodology shown in FIG. 7 may be implemented as hardware and/or software on an electronic control unit (ECU), microcontroller unit, or digital system processor that includes processor and memory for storing programming control code for controlling the operation of autonomous vehicles using advanced driver assistance systems.

An embodiment of a method 700 for diagnosing on-board vehicle sensors based on external sensor data may include steps 701-710 shown in the general order of FIG. 7, though the method may include more or fewer steps or can arrange the order of the steps differently than those shown. Generally, the method 700 starts with a start operation 701 and ends with step 710 after processing steps 702-709 which are executed as a set of computer-executable instructions by a computer system or processor and encoded or stored on a computer readable medium. In other configurations, the method 700 may be executed by a series of components, circuits, and gates created in a hardware device, such as a System of Chip (SOC), Application Specific Integrated Circuit (ASIC), and/or a Field Programmable Gate Array (FPGA). In other configurations, the method may be executed as an iterative loop where the processing steps 702-709 are periodically repeated on a predetermined schedule or on certain triggering events or when prompted by a vehicle driver.

Once the vehicle drive system starts and is operational at step 701, the vehicle's on-board sensors are activated and on-board sensor inputs are received at step 702. In particular, the activated on-board sensors generate sensor data input signals which are collected or received to provide the vehicle's own perception of the environment surrounding the vehicle. In selected embodiments, the sensor data signals may be provided by vehicle's on-board sensors 61 to the system processor 62.

At step 703, a local environmental map is generated or assembled from the on-board sensor data input signals. The local environmental map provides the perception of the surrounding environment by the vehicle. As generated, the local environmental map may include one or more different layers of information specifying various types of static and/or dynamic data which describe features in the local environment of the vehicle. In selected embodiments, the processing at step 703 may be performed by the system processor 62 which is connected to receive (or retrieve from memory) on-board sensor data input signals which are generated by the vehicle.

At step 704, the vehicle receives one or more V2X inputs from one or more external V2X sensor sources. As disclosed herein, the received V2X inputs may include sensor data signals which are collected by external V2X sources (e.g., remote V2X vehicles) that use remote sensors to measure or sense the environment surrounding each external V2X source. In selected embodiments, the sensor data signals received at step 704 may be received as collective perception messages 604 that are provided to a V2X processor 609.

At step 705, one or more environmental maps are generated or assembled from the received V2X inputs. In selected embodiments, separate environmental maps may be generated to provide the perception for each external V2X source or other traffic participants. As generated, each environmental map may include one or more different layers of information specifying various types of static and/or dynamic data which describe features in the local environment at each external V2X source. In selected embodiments, the processing at step 705 may be performed by a V2X signal processor which is connected to receive (or retrieve from memory) sensor data signals which are generated by external V2X sources or other traffic participants.

At step 706, the local and external environmental maps are compared to identify any traffic features from the external environmental maps that are missing from the local environmental map. As will be appreciated, each traffic feature that is "missing" from the local environmental map may signal the presence of an obstacle or threat that the on-board sensors did not detect and/or may signal that one or more of the on-board sensors are not operationally functional. In selected embodiments, the comparison of environmental maps may use a feature overlap analysis to identify one or more feature discrepancies from features in the external environmental maps that are not present in the local environmental map. In addition and as indicated with the parenthesis, the comparison processing may optionally assign different severity "scores" to each "missing" traffic feature that reflect the relative visibility and/or importance of the feature. In selected embodiments, the comparison (and scoring) processing at step 706 may be performed by a V2X-enhanced decision system processor which is connected to receive (or retrieve from memory) the local map (generated by the on-board sensors) and the external map(s) (generated by external V2X sources or other traffic participants).

At step 707, the weighted sum of scored feature discrepancies is computed. In selected embodiments, computation at step 707 performs a comparison of each feature extracted from an external environmental map for each available source of observation to the feature(s) extracted from the local environmental map to create a sum of missed feature instances, weighted by their severity score. In selected embodiments, the computation of the weighted sum of scored feature discrepancies at step 707 may be performed by a V2X-enhanced decision system processor which is configured to receive or compute severity scores based on apparent sensor visibility of the missed features and/or other feature-related data, such as relative distance, relative speed and sensor confidence scores, if available.

At step 708, the method determines if the weighted sum of scored feature discrepancies meets a minimum threshold. If the weighted sum is does not meet the threshold requirement (negative outcome to detection step 708), then correct operation of the on-board sensors is validated, and the diagnosis process ends (step 710). However, if the weighted sum of scored feature discrepancies is larger than a threshold (affirmative outcome to detection step 708), then the integrity of the on-board vehicle sensors should be assumed as degraded. In this case, the diagnosis process generates a sensor safety flag or action (step 709) so that subsequent actions (e.g., sensor inspection, disabling automation features, software update check, etc.) can be performed before the diagnosis process ends (step 710).

By now it should be appreciated that there has been provided a computer-implemented method, architecture, circuit, and system for performing diagnostic testing on one or more sensor. In the disclosed methodology, one or more on-board sensors on a vehicle collect a first set of sensor data signals. In selected embodiments, the first set of sensor data signals are collected by capturing sensor data signals with one or more on-board sensor located on the vehicle which are selected from a group consisting of a camera, lidar detector, radar detector and a microphone. The disclosed methodology also processes the first set of sensor data signals to generate a local environmental map identifying one or more first traffic features located in an exterior environment of the vehicle. In selected embodiments, the local environmental map is generated as a local dynamic map which includes permanent static data, transient static data, transient dynamic data, and/or highly dynamic data identifying the one or more first traffic features located in the exterior environment of the vehicle. In addition, the disclosed methodology collects a second set of sensor data signals from at least a first remote traffic participant and/or observer. In selected embodiments, the second set of sensor data signals are received over a V2X communication channel from at least the first remote traffic participant and/or observer. The disclosed methodology also processes the second set of sensor data signals to generate an external environmental map identifying one or more second traffic features located in an exterior environment of the first remote traffic participant and/or observer. In selected embodiments, the second set of sensor data signals are processed by generating a plurality of external environmental maps from a corresponding plurality of remote traffic participants selected from a group consisting of a remote V2X vehicle and/or a V2X traffic control device. In addition, the disclosed methodology performs a diagnostic sensor cross check on the one or more on-board sensors by comparing the local environmental map with at least the external environmental map to detect any discrepancy between the one or more first traffic features and the one or more second traffic features which indicates that one or more on-board sensors is defective. In selected embodiments, the diagnostic sensor cross check is performed by identifying a shared overlap area between the local environmental map and at least the external environmental map when either the local environmental map or the external environmental map exceed a predetermined size limit. In such embodiments, the diagnostic sensor cross check process includes extracting a first set of notable local features $F_L^S$ from the shared overlap area in the local environmental map, extracting a second set of notable external features $F_E^S$ from the shared overlap area in the external environmental map, and then comparing the first set of notable local features $F_L^S$ with the second set of notable external features $F_E^S$ to detect any discrepancy which indicates that one or more on-board sensors is defective. Finally, the disclosed methodology issues an on-board sensor error message in response to detecting any discrepancy which indicates that one or more on-board sensors is defective.

In another form, there is provided an advanced driver assistance system which includes one or more on-board vehicle sensors configured to collect first sensor data signals from respective portions of an environment of a vehicle. In selected embodiments, on-board vehicle sensor(s) are selected from a group consisting of a camera, lidar detector, radar detector and a microphone. In addition, the disclosed system includes one or more processors and data storage storing instructions that, when executed by the one or more processors, cause the system to perform operations which include processing the first sensor data signals to generate a local environmental map identifying one or more first traffic features located in the exterior environment of the vehicle. The executed instructions also cause the system to process second sensor data signals received from a Vehicle-to-everything (V2X) device to generate an external environmental map identifying one or more second traffic features located in an exterior environment of the V2X device. In selected embodiments, the V2X device is a remote V2X vehicle and/or a V2X traffic control device which is capable of communicating with the vehicle over a V2X communication channel. In other embodiments, the executed instructions cause the system to receive the second sensor data signals over a V2X communication channel from at least the V2X device. In addition, the executed instructions cause the system to perform a diagnostic sensor cross check on the one or more on-board vehicle sensors by comparing the local environmental map with at least the external environmental map to detect any discrepancy between the one or more first traffic features and the one or more second traffic features which indicates that one or more on-board vehicle sensors is defective. The executed instructions also cause the system to issue an on-board sensor error message in response to detecting any discrepancy which indicates that one or more on-board vehicle sensors is defective. In selected embodiments, the executed instructions cause the system to process the first sensor data signals by generating the local environmental map as a local dynamic map comprising permanent static data, transient static data, transient dynamic data, and/or highly dynamic data identifying the one or more first traffic features located in the exterior environment of the vehicle. In selected embodiments of the disclosed system, the processor(s) executes the instructions to perform the diagnostic sensor cross check by identifying a shared overlap area between the local environmental map and at least the external environmental map when either the local environmental map or the external environmental map exceeds a predetermined size limit. In such embodiments, the processor(s) may also execute instructions to perform the diagnostic sensor cross check by extracting a first set of notable local features $F_L^S$ from the shared overlap area in the local environmental map; extracting a second set of notable external features $F_E^S$ from the shared overlap area in the external environmental map; and comparing the first set of notable local features $F_L^S$ with the second set of notable external features $F_E^S$ to detect any discrepancy which indicates that one or more on-board sensors is defective.

In another form, there is provided an apparatus for operating an advanced driver assistance system (ADAS) on a vehicle which includes one or more on-board vehicle sensors arrayed to collect sensor data signals characterizing an exterior environment of the vehicle. As disclosed, the apparatus includes one or more electronic control units (ECUs) connected and configured to process a first set of sensor data signals received from the one or more on-board vehicle sensors to generate a local environmental map identifying one or more first traffic features located in an exterior environment of the vehicle. In addition, the ECU(s) are connected and configured to process a second set of sensor data signals received from a Vehicle-to-everything (V2X) device to generate an external environmental map identifying one or more second traffic features located in an exterior environment of the V2X device. In this configuration, the ECU(s) are configured to issue an on-board sensor error message in response to detecting any discrepancy when performing a diagnostic sensor cross check on the one or more on-board sensors by comparing the local environmental map with at least the external environmental map to detect any discrepancy between the one or more first traffic features and the one or more second traffic features which indicates that one or more on-board sensors is defective. In selected embodiments, the ECU(s) are configured to process the first set of sensor data signals by generating the local environmental map as a local dynamic map comprising permanent static data, transient static data, transient dynamic data, and/or highly dynamic data identifying the one or more first traffic features located in the exterior environment of the vehicle. In addition, the ECU(s) may be configured to receive the second set of sensor data signals over a V2X communication channel from V2X device which is selected from a group consisting of a remote V2X vehicle and/or a V2X traffic control device. In addition, the ECU(s) may be configured to generate a plurality of external environmental maps from a corresponding plurality of remote V2X devices and to compare each of the plurality of external environmental maps to the local environmental map when performing the diagnostic sensor cross check on the one or more on-board sensors. In other embodiments, the ECU(s) are configured to perform the diagnostic sensor cross check by identifying a shared overlap area between the local environmental map and at least the external environmental map when either the local environmental map or the external environmental map exceeds a predetermined size limit. In such embodiments, the ECU(s) may also be configured to perform the diagnostic sensor cross check further by extracting a first set of notable local features $F_L^S$ from the shared overlap area in the local environmental map; extracting a second set of notable external features $F_E^S$ from the shared overlap area in the external environmental map; and comparing the first set of notable local features $F_L^S$ with the second set of notable external features $F_E^S$ to detect any discrepancy which indicates that one or more on-board sensors is defective.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages.

Aspects of the present invention are described hereinabove with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In certain implementations, a system on a chip or SOC may be implemented.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the described exemplary embodiments disclosed herein focus on example autonomous driver systems, devices, and methods for using sensor data from external V2X sources to perform a cross-check diagnosis of on-board vehicle sensors, the present disclosure is not necessarily limited to the example embodiments illustrate herein. For example, various embodiments of using sound sensors may be applied in any suitable autonomous systems, and not just autonomous driver systems, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-implemented method for performing diagnostic testing on one or more sensors, comprising:
   collecting, by one or more on-board sensors on a vehicle, a first set of sensor data signals;
   processing by at least one processor unit included in the vehicle, the first set of sensor data signals to generate a local environmental map identifying one or more first traffic features located in an exterior environment of the vehicle;
   collecting, by the at least one processor unit from at least a first remote traffic participant or observer, a second set of sensor data signals, where collecting the second set of sensor data signals comprises receiving the second set of sensor data signals over a V2X communication channel from at least the first remote traffic participant or observer;
   processing, by the at least one processor unit, the second set of sensor data signals to generate an external environmental map identifying one or more second traffic features located in an exterior environment of the first remote traffic participant or observer;
   performing, by the at least one processor unit, a diagnostic sensor cross check on the one or more on-board sensors by comparing the local environmental map with at least the external environmental map to detect at least one discrepancy between the one or more first traffic features and the one or more second traffic features, wherein the at least one discrepancy includes one or more missing traffic features;
   assigning, by the at least one processor unit, severity scores to the one or more missing traffic features of the at least one discrepancy detected when performing the diagnostic sensor cross check; and
   issuing, by the at least one processor unit, an on-board sensor error message in response to determining that the severity scores indicate that one or more of the on-board sensors is defective.

2. The computer-implemented method of claim 1, where collecting the first set of sensor data signals comprises capturing sensor data signals with one or more on-board sensors located on the vehicle which are selected from a group consisting of a camera, lidar detector, radar detector and a microphone.

3. The computer-implemented method of claim 1, where processing the first set of sensor data signals comprises generating the local environmental map as a local dynamic map comprising permanent static data, transient static data, transient dynamic data, or highly dynamic data identifying the one or more first traffic features located in the exterior environment of the vehicle.

4. The computer-implemented method of claim 1, where processing the second set of sensor data signals comprises generating a plurality of external environmental maps from a corresponding plurality of remote traffic participants selected from a group consisting of a remote V2X vehicle or a V2X traffic control device.

5. The computer-implemented method of claim 1, where performing the diagnostic sensor cross check comprises identifying a shared overlap area between the local environmental map and at least the external environmental map when either the local environmental map or the external environmental map exceeds a predetermined size limit.

6. The computer-implemented method of claim 5, where performing the diagnostic sensor cross check further comprises:
   extracting a first set of notable local features $F_L^S$ from the shared overlap area in the local environmental map;
   extracting a second set of notable external features $F_E^S$ from the shared overlap area in the external environmental map; and
   comparing the first set of notable local features $F_L^S$ with the second set of notable external features $F_E^S$ to detect any discrepancy which indicates that one or more on-board sensors is defective.

7. A system comprising:
one or more on-board vehicle sensors configured to collect first sensor data signals from respective portions of an environment of a vehicle;
one or more processors and data storage, each included in the vehicle, the data storage storing instructions that, when executed by the one or more processors, cause the system to perform operations comprising:
processing the first sensor data signals to generate a local environmental map identifying one or more first traffic features located in the exterior environment of the vehicle;
processing second sensor data signals received from a Vehicle-to-everything (V2X) device via a V2X communication channel to generate an external environmental map identifying one or more second traffic features located in an exterior environment of the V2X device;
performing a diagnostic sensor cross check on the one or more on-board vehicle sensors by comparing the local environmental map with at least the external environmental map to detect at least one discrepancy between the one or more first traffic features and the one or more second traffic features, wherein the at least one discrepancy includes one or more missing traffic features; and
assigning severity scores to the one or more missing traffic features of the at least one discrepancy detected when performing the diagnostic sensor cross check; and
issuing an on-board sensor error message in response to determining that the severity scores indicate that one or more of the on-board vehicle sensors is defective.

8. The system of claim 7, where the one or more on-board vehicle sensors are selected from a group consisting of a camera, lidar detector, radar detector and a microphone.

9. The system of claim 7, where the one or more processors executes the instructions to process the first sensor data signals by generating the local environmental map as a local dynamic map comprising permanent static data, transient static data, transient dynamic data or highly dynamic data identifying the one or more first traffic features located in the exterior environment of the vehicle.

10. The system of claim 7, where the one or more processors executes the instructions to receive the second sensor data signals over the V2X communication channel from at least the V2X device.

11. The system of claim 7, where the V2X device comprises a remote V2X vehicle or a V2X traffic control device which is capable of communicating with the vehicle over a V2X communication channel.

12. The system of claim 7, where the one or more processors executes the instructions to perform the diagnostic sensor cross check by identifying a shared overlap area between the local environmental map and at least the external environmental map when either the local environmental map or the external environmental map exceeds a predetermined size limit.

13. The system of claim 12, where the one or more processors executes the instructions to perform the diagnostic sensor cross check by:
extracting a first set of notable local features $F_L^S$ from the shared overlap area in the local environmental map;
extracting a second set of notable external features $F_E^S$ from the shared overlap area in the external environmental map; and
comparing the first set of notable local features $F_L^S$ with the second set of notable external features $F_E^S$ to detect any discrepancy which indicates that one or more on-board sensors is defective.

14. An apparatus for operating an advanced driver assistance system (ADAS) on a vehicle comprising one or more on-board vehicle sensors arrayed to collect sensor data signals characterizing an exterior environment of the vehicle, the apparatus comprising:
one or more electronic control units (ECUs) disposed in the vehicle and connected to process a first set of sensor data signals received from the one or more on-board vehicle sensors to generate a local environmental map identifying one or more first traffic features located in an exterior environment of the vehicle and to process a second set of sensor data signals received from a Vehicle-to-everything (V2X) device via a V2X communication channel to generate an external environmental map identifying one or more second traffic features located in an exterior environment of the V2X device, wherein the one or more ECUs are configured to;
perform a diagnostic sensor cross check on the one or more on-board sensors by comparing the local environmental map with at least the external environmental map to detect at least one discrepancy between the one or more first traffic features and the one or more second traffic features, wherein the at least one discrepancy includes one or more missing traffic features;
assign severity scores to the one or more missing traffic features of the at least one discrepancy detected when performing the diagnostic sensor cross check; and
issue an on-board sensor error message in response to determining that the severity scores indicate that one or more of the on-board sensors is defective.

15. The apparatus of claim 14, where the one or more ECUs are configured to process the first set of sensor data signals by generating the local environmental map as a local dynamic map comprising permanent static data, transient static data, transient dynamic data or highly dynamic data identifying the one or more first traffic features located in the exterior environment of the vehicle.

16. The apparatus of claim 15, where the one or more ECUs are configured to receive the second set of sensor data signals over the V2X communication channel from V2X device which is selected from a group consisting of a remote V2X vehicle and a V2X traffic control device.

17. The apparatus of claim 15, where the one or more ECUs are configured to generate a plurality of external environmental maps from a corresponding plurality of remote V2X devices and to compare each of the plurality of external environmental maps to the local environmental map when performing the diagnostic sensor cross check on the one or more on-board sensors.

18. The apparatus of claim 14, where the one or more ECUs are configured to perform the diagnostic sensor cross check by identifying a shared overlap area between the local environmental map and at least the external environmental map when either the local environmental map or the external environmental map exceeds a predetermined size limit.

19. The apparatus of claim 18, where the one or more ECUs are configured to perform the diagnostic sensor cross check further by:
extracting a first set of notable local features $F_L^S$ from the shared overlap area in the local environmental map;

extracting a second set of notable external features $F_E^S$ from the shared overlap area in the external environmental map; and comparing the first set of notable local features $F_L^S$ with the second set of notable external features $F_E^S$ to detect any discrepancy which indicates that one or more on-board sensors is defective.

\* \* \* \* \*